US006447200B1

(12) United States Patent
Hungerford, III

(10) Patent No.: US 6,447,200 B1
(45) Date of Patent: Sep. 10, 2002

(54) CONNECTOR DEVICE FOR SUPPORTING A TUBULAR MEMBER

(75) Inventor: C. Stuart Hungerford, III, Clearwater, FL (US)

(73) Assignee: Linking Industries, LLC, Clearwater, FL (US)

( * ) Notice: Subject to any disclaimer, the term of this patent is extended or adjusted under 35 U.S.C. 154(b) by 48 days.

(21) Appl. No.: 09/602,500

(22) Filed: Jun. 23, 2000

(51) Int. Cl.[7] .................................................. B25G 3/20

(52) U.S. Cl. ...................... 403/374.1; 403/373; 411/85; 411/104; 248/72

(58) Field of Search ............................ 411/84, 85, 104; 248/72, 73, 222.52; 403/373, 374.1, 409.1, 348, 350, 97, 298, 297

(56) References Cited

U.S. PATENT DOCUMENTS 4,353,519 A * 10/1982 Bogart
4,600,174 A 7/1986 Gosse et al.
4,662,590 A * 5/1987 Hungerford
4,917,553 A * 4/1990 Muller
5,061,000 A * 10/1991 Haugen
5,209,619 A * 5/1993 Rinderer
5,375,798 A * 12/1994 Hungerford
5,624,217 A * 4/1997 Hungerford

* cited by examiner

*Primary Examiner*—Lynne H. Browne
*Assistant Examiner*—Ernesto Garcia
(74) *Attorney, Agent, or Firm*—Dennis G. LaPointe; Mason & Assoc., PA

(57) ABSTRACT

A connector having gripping teeth which are formed intrinsically with a first set of locking lugs which are in a parallel relationship with a second set of locking lugs, the first and second set of locking lugs being spaced apart with two parallel supporting posts disposed therebetween. The second set of locking lugs has a bore through an approximate center thereof and the first set of locking lugs is split in two portions to form a slit aligned with an axis of the central bore of the second set of locking lugs such that a screw or similar fastener can be inserted so as to open the slit for forcing the gripping teeth against a channel member wall surface.

34 Claims, 3 Drawing Sheets

10 24 18 16 30 30 28a 28b 58 56 40 38 20 12 46 26 14 22

CONNECTOR DEVICE FOR SUPPORTING A TUBULAR MEMBER

BACKGROUND OF THE INVENTION

1. Field of the Invention

The invention relates to a connector device with integral gripping teeth, used for supporting a tubular member.

2. Description of Related Art

Connector devices for channel members used to support a tubular member, such as conduit, cable, pipe or length of tubing, are known in the art. However, none of the prior art connector devices uses gripping teeth formed integrally with the connector. Known related art includes the connector device depicted in U.S. Pat. Nos. 4,662,590 and 5,375,798 to Hungerford, Jr. However, the former device has a single rigid column supporting the lugs in the connector. Also, and does not use gripping teeth on any of the lugs to ensure a secure connection with the channel member. The latter device connects its lug elements with two flexible strips instead of a single supporting rigid column. Also, this device fails to incorporate the gripping teeth structure as defined herein.

Other known prior art includes U.S. Pat. No. 4,353,519 to Bogart. The connector device in Bogart uses a ratchet and pawl system to connect the device to the channel member. However, unlike the present device, Bogart fails to use the teeth to grip the inside walls of the channel member, and Bogart fails to teach the post and lug structure as defined herein. Other known related prior art includes U.S. Pat. No. 4,600,174 to Gosse. While Gosse does mention "teeth" in its specification, the elements described are actually overhanging lips used to connect the device to the outside of a support section.

None of the devices in the above references solve the problem of a connector that is secured to a channel member with the security that gripping teeth formed as part of the connector provide. With those teeth, the connector in the present invention tightly grabs the interior wall of the channel member. The present invention may be molded as a single piece of plastic, thereby saving fabrication time and associated manufacturing costs. In addition, the connector may be fabricated by co-molding the teeth onto the connector device using stronger plastic for the teeth than that which comprises the rest of the connector, thereby increasing the strength and durability of the connection.

Already known in the art are connectors with gripping teeth which are inserted into the sides of one set of the locking lugs comprising part of the invention, as described in the attached sales literature. The teeth are made from metal, and are inserted manually into the insertion area in the connector. Because of the high shrinkage factor in certain materials, the known connector can only be made of certain materials which would properly receive and secure the inserted gripping teeth. Furthermore, the labor costs associated with this type of fabrication are enormous. However, by forming the teeth as part of the connector, or co-molding the teeth directly onto the connector, there is considerable cost savings. Furthermore, there is no restriction on the materials because tooling for the insertion process is no longer necessary in the manufacturing process for the connector device.

SUMMARY OF THE INVENTION

The principal object of the invention is to provide a connector device, used for supporting a tubular member, which has gripping teeth.

In one embodiment, the connector comprises two spaced apart supporting posts, the supporting posts supporting a first set of locking lugs and an opposed second set of locking lugs being in a predetermined, spaced-apart relationship, the first and second set of locking lugs being disposed in a generally parallel relationship and the two spaced-apart supporting posts being disposed in a generally parallel relationship with each other and a generally perpendicular relationship to the first set and the second set of locking lugs, the second set of locking lugs having a bore disposed through an approximate center thereof, the first set of locking lugs further being split in two portions to form a slit aligned with an axis of the central bore of tie second set of locking lugs such that a fastener means received within the bore is effective to open the slit, each respective portion of the first set of locking lugs being integrally formed with a corresponding supporting post to form a T-shaped configuration extending from the second set of locking lugs, and the first set of locking lugs having opposed bearing surfaces at a portion of a periphery of the first set of locking lugs for engagement with a wall surface of the channel member when the slit is opened, the bearing surfaces further including one or more integral gripping teeth extending outwardly from the bearing surfaces for providing gripping engagement with the channel member wall surface.

In another embodiment, the one or more gripping teeth project at an angle from the opposed bearing surfaces of the first set of locking lugs. In yet another embodiment, at least one set of diagonally opposed corners of the first set of locking lugs is one of rounded and chamfered. In still another embodiment, one or more gripping teeth are aligned to project at an angle from the opposed bearing surfaces of the first set of locking lugs. In yet still another embodiment, the connector is an integral solid element. In yet another embodiment, the connector is made from an integral piece of material comprising plastic, polymers, co-polymers and fiber-reinforced polymers. In still another embodiment, the one or more gripping teeth is integrally molded onto the bearing surfaces of the first set of locking lugs. In another embodiment, the material for the one or more gripping teeth is a polymer containing nylon, and the material for the rest of the connector is a polymer which does not contain nylon.

In another embodiment, the one or more gripping teeth is made from a material which is harder than the material of the first set of locking lugs, the two spaced-apart supporting posts and the second set of locking lugs. In still another embodiment, the one or more gripping teeth and the first set of locking lugs are made from a material which is harder than the material of the second set of locking lugs. In yet still another embodiment, the one of more gripping teeth, the first set of locking lugs and the two spaced-apart supporting posts are made from a material which is harder than the material of the second set of locking lugs. In yet another embodiment, the connector has a raised pedestal between the posts and the second set of locking lugs.

In another embodiment, the invention comprises a method of connecting objects to a channel member, comprising the steps of providing a construction channel member, placing, within the channel of the member, a connector, comprising two spaced-apart supporting posts, the supporting posts supporting a first set of locking lugs and an opposed second set of locking lugs being in a predetermined, spaced-apart relationship, the first and second set of locking lugs being disposed in a generally parallel relationship and the two spaced-apart supporting posts being disposed in a generally parallel relationship with each other and a generally perpendicular relationship to the first set and the second set of locking lugs, the second set of locking lugs having a bore disposed through an approximate center thereof, the first set of locking lugs further being split in two portions to form a slit Aligned with an axis of the central bore of the second set of looking lugs such that a fastener means received within the bore is effective to open the slit, each respective portion of the first set of locking lugs being integrally formed with a corresponding supporting post to form a T-shaped configuration extending from the second set of locking lugs, and the first set of locking lugs having opposed bearing surfaces at a portion of a periphery of the first set of locking lugs for engagement with a wall surface of the channel member when the slit is opened, the bearing surfaces further including one or more gripping teeth extending outwardly from the bearing surfaces for providing gripping engagement with the channel member wall surface, aligning the connector so that the gripping teeth on the first set of locking lugs faces inside walls of the channel member, placing an object to be connected to the channel member between the connector and a fastener, and fastening the object by engaging a fastener through the object further through the bore further into engagement with the slit to move the gripping teeth into contact with the inside walls of the channel member.

In another embodiment of the method, the one or more gripping teeth project at an angle from the opposed bearing surfaces of the first set of locking lugs. In yet another embodiment, at least one set of diagonally opposed corners of the first set of locking lugs is one of rounded and chamfered. In still another embodiment, one or more gripping teeth are aligned to project at an angle from the opposed bearing surfaces of the first set of locking lugs. In yet still another embodiment, the connector is a solid element.

In another embodiment, the connector is made from an integral piece of material or components made of plastic, polymers, co-polymers, fiber-reinforced polymers and metals. In still another embodiment, the one or more gripping teeth is integrally molded onto the bearing surfaces of the first set of locking lugs. In yet still another embodiment, the material for the one or more gripping teeth is a polymer containing nylon, and the material for the rest of the connector is a polymer which does riot contain nylon.

In still another embodiment, the one or more gripping teeth is male from a material which is harder than the material of the first set of locking lugs, the two spaced-apart supporting posts and the second set of locking lugs. In yet another embodiment, the one or more gripping teeth and the first set of locking lugs are made from a material which is harder than the material of the second set of locking lugs. In yet still another embodiment, the one or more gripping teeth, the first set of locking lugs and the two spaced-apart supporting posts are made from a material which is harder than the material of the second set of locking lugs. In yet another embodiment, the connector further comprises a raised pedestal between the posts and the second set of locking lugs.

BRIEF DESCRIPTION OF THE DRAWINGS

For a fuller understanding of the nature and objects of the invention, reference should be made to the following detailed description, taken in connection with the accompanying drawings, in which.

These drawings are illustrative only and are not intended to limit the claims herein in any way.

DETAILED DESCRIPTION OF THE INVENTION

Figure 1:
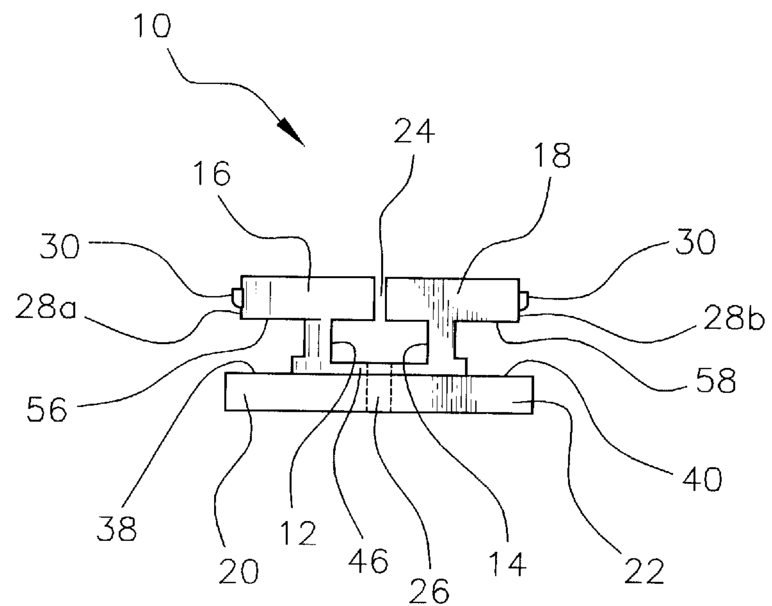
FIG. 1 is a side elevation of one embodiment of the invention.

Referring now to the drawings, in particular FIG. 1, the invention which is a connector is depicted generally as 10. The connector may be made from plastics, metals or other materials known in the art, or a combination of these materials. The connector 10 comprises a first supporting post 12 and a second supporting post 14 spaced apart by a predetermined distance and in a generally parallel relationship with one another. The supporting posts 12,14 support a first set of locking lugs 16,18 and an opposed second set of locking lugs 20,22 set in a predetermined spaced apart relationship. Furthermore, the first set of locking lugs 16,18 and the second set of locking lugs 20,22 are in a generally parallel relationship. The supporting posts 12,14 are in a generally perpendicular relationship to the first set of locking lugs 16,18 and the second set of locking lugs 20,22.

Figure 3:
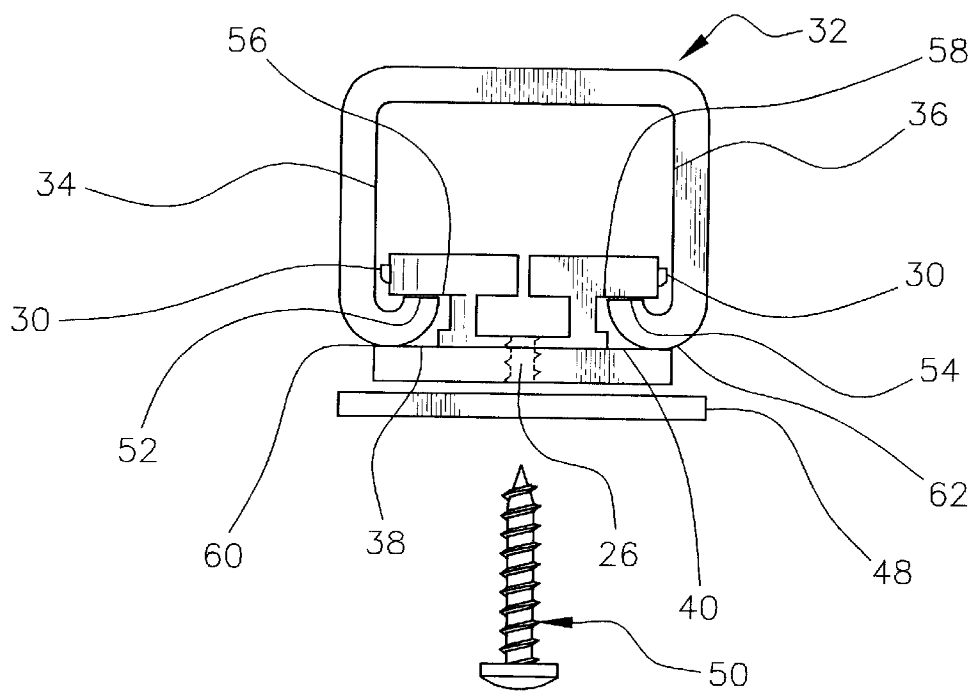
FIG. 3 is a side elevation of one embodiment of the invention in use.

As illustrated in FIG. 1, the first set of locking lugs 16,18 is split into a first portion 16 and a second portion 18 to form a slit 24. The second set of locking lugs 20,22 has a bore 26 disposed approximately through its center. The bore 26 may be internally threaded, as shown in FIG. 3. Such threaded bore 26 may be incorporated by several methods known in the art, including machining, direct molding, or by incorporating a separate sleeve insert (not shown). The slit 24 is aligned with an axis of the central bore 26 of the second set of locking lugs 20,22 such that a fastener means received within the bore 26 is effective to open the slit 24 as described below.

Figure 2:
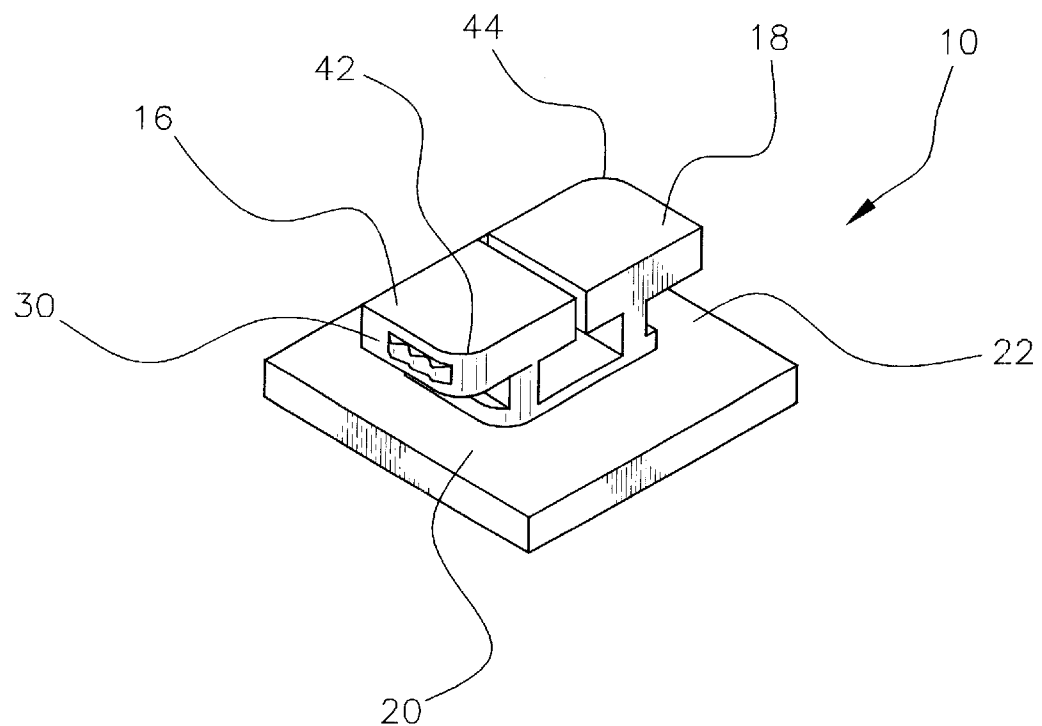
FIG. 2 is a perspective view of one embodiment of the invention.

Each respective portion of the first set of locking lugs 16,18 is integrally formed with a corresponding supporting post 12,14 to form a T-shaped configuration extending from the second set of locking lugs 20,22. As illustrated in FIGS. 1 and 2, the first set of locking lugs 16,18 has opposed bearing surfaces 28*a*,2B*b* at a portion of the periphery of the first set of locking lugs 16,18. The opposed bearing surfaces 28*a*,28*b* of the first set of locking lugs 16,18 further include one or more integral gripping teeth 30 extending outwardly from the bearing surfaces 28*a*,28*b* of the first set of locking lugs 16,18.

Figure 4:
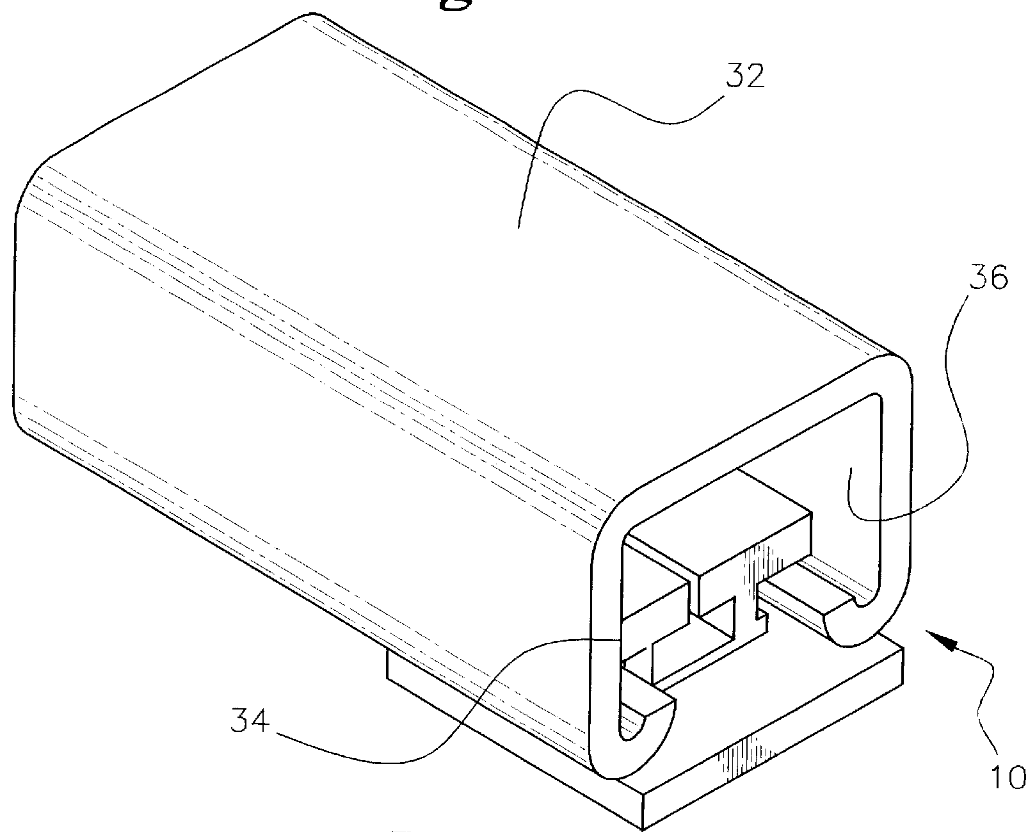
FIG. 4 is a perspective view of one embodiment of the invention in use.

As shown in FIGS. 3 and 4, the connector 10 is used to engage with a channel member 32. The integral gripping teeth 30 of the bearing surfaces 28*a*,28*b* of the first set of locking lugs 16,18 provide gripping engagement with the interior surfaces 34 and 36 of the channel member 32. As illustrated in FIG. 2, one or more of the gripping teeth 30 of the bearing surfaces 28*a*,28*b* of the first set of locking lugs 16,18 may project at an angle from the opposed bearing surfaces 28*a*,28*b* of the first set of locking lugs 16,18. Also, at least one set of diagonally opposed corners 42,44 may be rounded or chamfered to facilitate rotation of the connector 10 as described below.

Furthermore, the connector 10 may be an integral or unitary solid element made from thermoplastic, polymers, co-polymers, fiber reinforced polymers, nylon, metals or other similar materials known in the art.

In the manufacture of the connector 10, the one or more gripping teeth 30 of the bearing surfaces 28*a*,28*b* of the first set of locking lugs 16,18 may be-integrally molded onto the bearing surfaces 28*a*,28*b*. The integral molding process may comprise of the method of inserting one type of polymer into the mold for the gripping teeth and another polymer into the rest of the told of the connector 10. In this process, the connector 10 may be molded in one piece, and a harder material may be inserted in the mold for the gripping teeth 30 than the material inserted in the mold of the rest of the connector. For example, the material used in the mold for the gripping teeth 30 may be a nylon polymer, while the material used in the mold for the rest of the connector 10 may be a polymer without nylon. Other combinations of materials which result in a harder material used in the mold for the gripping teeth 30 than the material used in the mold for the rest of the connector 10 are also contemplated. It is also contemplated that the connector 10 could be manufactured by injection molding, machining or combinations thereof. In the molding process, the polymer or metal used for the gripping teeth 30 may migrate into the part during the molding portion of the manufacturing process. Alternatively, the teeth 30 of locking lugs 16,18 may be inserted within the unitary piece 10 as a secondary manufacturing process or step. This molding process allows the part to be made to accommodate all material types of struts and channel members, such as metal, fiberglass and other materials, as both an integral and component parts. With the latter option of incorporating the teeth 30 in the locking lugs 16,18, the connector 10 becomes more useful in field implementation and can be changed at the manufacturing level thus offering more applications from the same part.

In the molding process, the polymer used for the gripping teeth 30 may migrate into the part of the mold for the first set of locking lugs 16,18, and still further into the part of the mold for the spaced apart supporting posts 12,14. Thus, the gripping teeth 30 of the connector 10 may be made from a material which is harder than the material of the first set of locking lugs 16,18, the two spaced apart supporting posts 12,14, and the second set of locking lugs 20,22. Also, the gripping teeth 30 and the first set of locking lugs 16,18 may be made from a material which is harder than the material of the two spaced apart supporting posts 12,14 and the second set of locking lugs 20,22. In addition, the gripping teeth 30, the first set of locking lugs 16,18 and the two spaced apart supporting posts 12,14 may be made from a material which is harder than the second set of locking lugs 20,22.

The invention may be used with a channel member 32, as shown in FIGS. 3 and 4. However, other configurations of channel members are known in the art. The connector 10 is placed in the channel member 32 as shown in FIG. 3. The illustrated channel member 32 is only one type contemplated for use with this invention. Other channel member configurations are known in the art. The connector 10 may be inserted into the channel member 32 with the gripping teeth 30 generally perpendicular to the side wall interior surfaces 34,36 of the channel member 32, and then rotated so that the gripping teeth 30 face the interior surface 34,36. An object 48 is placed between the connector 10 and a fastener 50. The fastener 50 may be a screw, bolt or other known means in the art. The fastener 50 may be of metal, plastic, ceramic or other typical fastener material known in the art. The fastener 50 is placed through the object 48 through the bore 26 in the second set of locking lugs 20,22 in the connector 10 and engages with the slit 24 between the first set of locking lugs 16,18. The interaction between the fastener 50 and the slit 24 moves the first set of locking lugs 16,18 apart from each other. Thus, the gripping teeth 30 are brought into engagement with the interior surfaces 34,36 of the channel member 32. The resting surfaces 52,54 of the channel member 32 may be in contact with the contact surfaces 56,58 of the first set of locking lugs 16,18. Also, the lower portions 60,62 of the channel member 32 may be in contact with the contact surfaces 38,40 of the second set or locking lugs 20,22.

Figure 5:
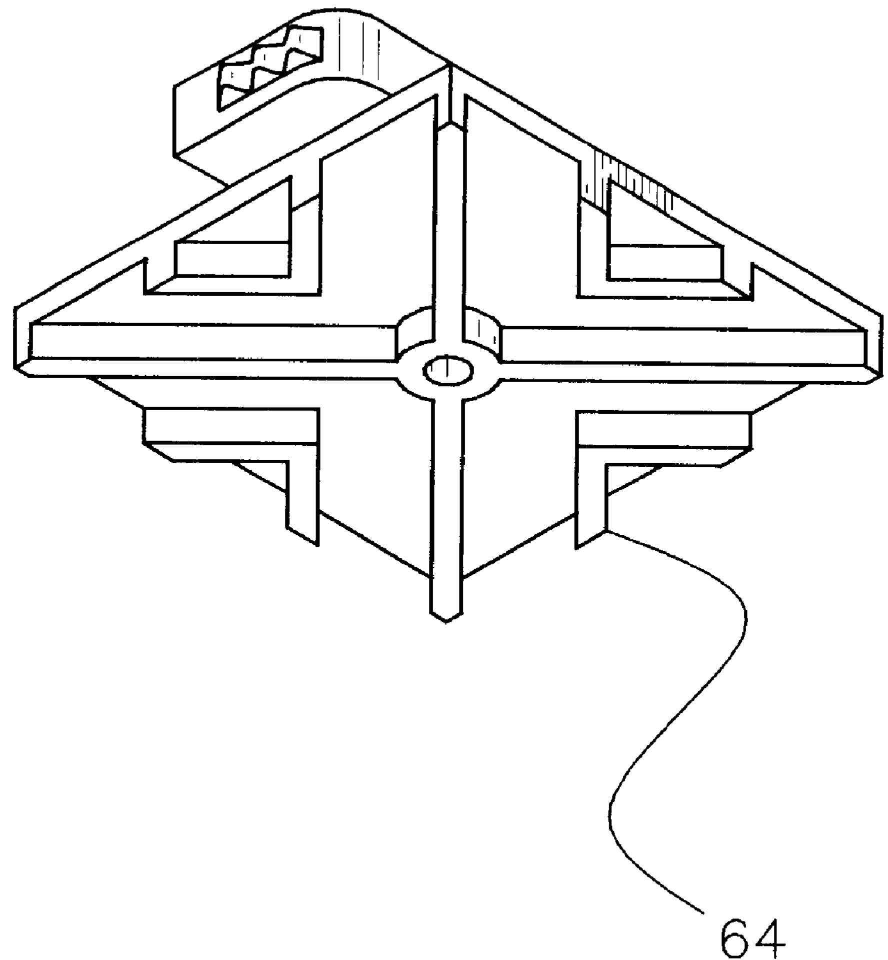
FIG. 5 is a perspective view depicting a typical application of a pattern for the top surface of the connector.

Also, as illustrated in FIG. 5, the top surface of the connector may be comprised of a series of cross-hatches or ribs 64. The pattern shown in FIG. 5 is illustrative only, as other patterns are also contemplated. The cross-hatches or ribs 64 provide increased stability for the connector 10 when in use with a channel member 32. When an object 48 is placed between the connector 10 and the fastener 50, the cross-hatching or ribs 64 on the top surface of the connector 10 will help prevent the object 48 from slipping, rotating or dipping when fastening the fastener 50. Furthermore, the cross-hatching or ribs 64 helps the object 48 fastened between the connector 10 and the fastener 50 be n secure non-slipping contact with the connector 10.

As seen from the foregoing description, the present invention satisfies a long felt need to provide a secure connector device at a reduced cost and with less fabrication time, thereby providing valuable cost savings in the manufacture of these types of connectors.

The invention is clearly new and useful. Moreover, it was not obvious to those of ordinary skill in this art at the time it was made, in view of the prior art considered as a whole as required by law.

It will thus be seen that the objects set forth above, and those made apparent from the foregoing description, are efficiently attained and since certain changes may be made in the above construction without departing from the scope of the invention, it is intended that all matters contained in the foregoing construction or shown in the accompanying drawings shall be interpreted as illustrative and not in the limiting sense. In addition, the independent patentability of the dependent claims is herein asserted.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A connector for facilitating a connection between a channel member and a tubular member support, comprising:

two spaced apart supporting posts, the supporting posts supporting a first set of locking lugs and an opposed second set of locking lugs being in a predetermined, spaced-apart relationship;

the first and second set of locking lugs being disposed in a generally parallel relationship and the two spaced-apart supporting posts being disposed in a generally parallel relationship with each other and a generally perpendicular relationship to the first set and the second set of locking lugs;

the second set of locking lugs having a bore disposed through an approximate center thereof;

the first set of locking lugs further being split in two portions to form a slit aligned with an axis of the central bore of the second set of locking lugs such that a fastener means received within the bore is effective to open the slit;

each respective portion of the first set of locking lugs being integrally formed with a corresponding supporting post to each form a T-shaped configuration having an aparture therebetween extending from the second set of locking lugs; and the first set of locking lugs having opposed bearing surfaces at a portion of a periphery of the first set of locking lugs for engagement with a wall surface of the channel member when the slit is opened, the bearing surfaces further including one or more gripping teeth extending outwardly from the bearing surfaces for providing gripping engagement with the channel member wall surface.

2. The connector of claim 1, wherein the one or more gripping teeth project at an angle from the opposed bearing surfaces of the first set of locking lugs.

3. The connector of claim 1, wherein at least one set of diagonally opposed corners of the first set of locking lugs is one of rounded and chamfered.

4. The connector of claim 3, wherein one or more gripping teeth are aligned to project at an angle from the opposed bearing surfaces of the first set of locking lugs.

5. The connector of claim 1, wherein the connector is an integral solid element.

6. The connector of claim 5, wherein the connector is made from an integral piece of material comprising one of thermoplastic, polymers, co-polymers, fiber-reinforced polymers, metals and combinations thereof.

7. The connector of claim 1, wherein the one or more gripping teeth is integrally molded onto the bearing surfaces of the first set of locking lugs.

8. The connector of claim 1, wherein the material for the one or more gripping teeth is a polymer containing nylon, and the material for the rest of the connector is one of a polymer which does not contain nylon, metal and combinations thereof.

9. The connector of claim 1, wherein the one or more gripping teeth is made from a material which is harder than the material of the first set of locking lugs, the two spaced-apart supporting posts and the second set of locking lugs.

10. The connector of claim 1, wherein the one or more gripping teeth and the first set of locking lugs are made from a material which is harder than the material of the second set of locking lugs.

11. The connector of claim 1, wherein the one or more gripping teeth, the first set of locking lugs and the two spaced-apart supporting posts are made from a material which is harder than the material of the second set of locking lugs.

12. The connector of claim 1, further comprising a raised pedestal between the posts and the second set of locking lugs.

13. The connector of claim 1, wherein the bore is threaded.

14. The connector of claim 1, wherein the second set of locking lugs includes a slip resistant pattern on a top surface thereof for facilitating the securing of the tubular member support.

15. The connector of claim 1, wherein the connector is made of material comprising one of thermoplastic, polymers, co-polymers, fiber-reinforced polymers, metals and combinations thereof.

16. The connector of claim 1, wherein the one or more gripping teeth is inserted and secured in the first set of locking lugs during manufacture of said connector.

17. The connector of claim 1, wherein the material for the one or more gripping teeth is one of a polymer containing nylon, metal and combinations thereof, and the material for the rest of the connector is one of a polymer which does not contain nylon, metal and combinations thereof.

18. A method of facilitating a connection between a channel member and a tubular member support, comprising the steps of:

providing a construction channel member;

placing, within the channel of the member, a connector, comprising:

two spaced-apart supporting posts, the supporting posts supporting a first set of locking lugs and an opposed second set of locking lugs being in a predetermined, spaced-apart relationship;

the first and second set of locking lugs being disposed in a generally parallel relationship and the two spaced-apart supporting posts being disposed in a generally parallel relationship with each other and a generally perpendicular relationship to the first set and the second set of locking lugs;

the second set of locking lugs having a bore disposed through an approximate center thereof;

the first set of locking lugs further being split in two portions to form a slit aligned with an axis of the central bore of the second set of locking lugs such that a fastener means received within the bore is effective to open the slit;

each respective portion of the first set of locking lugs being integrally formed with a corresponding supporting post to each form a T-shaped configuration having an aparture therebetween extending from the second set of locking lugs; and the first set of locking lugs having opposed bearing surfaces at a portion of a periphery of the first set of locking lugs for engagement with a wall surface of the channel member when the slit is opened, the bearing surfaces further including one or more gripping teeth extending outwardly from the bearing surfaces for providing gripping engagement with the channel member wall surface; aligning the connector so that the gripping teeth on the first set of locking lugs faces side wall interior surfaces of the channel member;

placing an object to be connected to the channel member between the connector and a fastener; and fastening the object by engaging a fastener through the object further through the bore further into engagement with the slit to move the gripping teeth into contact with the side wall interior surfaces of the channel member.

19. The method of claim 18, wherein the one or more gripping teeth project at an angle from the opposed bearing surfaces of the first set of locking lugs.

20. The method of claim 18, wherein at least one set of diagonally opposed corners of the first set of locking lugs is one of rounded and chamfered.

21. The method of claim 18, wherein one or more gripping teeth are aligned to project at an angle from the opposed bearing surfaces of the first set of locking lugs.

22. The method of claim 18, wherein the connector is an integral solid element.

23. The method of claim 18, wherein the connector is made from an integral piece of material comprising one of thermoplastic, polymers, co-polymers, fiber-reinforced polymers, metals and combinations thereof.

24. The method of claim 18, wherein the one or more gripping teeth is integrally molded onto the bearing surfaces of the first set of locking lugs.

25. The method of claim 18, wherein the material for the one or more gripping teeth is a polymer containing nylon, and the material for the rest of the connector is one of a polymer which does not contain nylon, metal and combinations thereof.

26. The method of claim 18, wherein the one or more gripping teeth is made from a material which is harder than the material of the first set of locking lugs, the two spaced-apart supporting posts and the second set of locking lugs.

27. The method of claim 18, wherein the one or more gripping teeth and the first set of locking lugs are made from a material which is harder than the material of the second set of locking lugs.

28. The method of claim 18, wherein the one or more gripping teeth, the first set of locking lugs and the two spaced-apart supporting posts are made from a material which is harder than the material of the second set of locking lugs.

29. The method of claim 18, wherein the connector further comprises a raised pedestal between the posts and the second set of licking lugs.

30. The method of claim 18, wherein the bore is threaded.

31. The method of claim 18, wherein the second set of locking lugs includes a slip resistant pattern on a top surface thereof for facilitating the securing of the tubular member support.

32. The method of claim 18, wherein the connector is made of material comprising one of thermoplastic, polymers, co-polymers, fiber-reinforced polymers, metals and combinations thereof.

33. The method of claim 18, wherein the one or more gripping teeth is inserted and secured in the first set of locking lugs during manufacture of said connector.

34. The method of claim 18, wherein the material for the one or more gripping teeth is one of a polymer containing nylon, metal, and combinations thereof, and the material for the rest of the connector is one of a polymer which does not contain nylon, metal and combinations thereof.

* * * * *

UNITED STATES PATENT AND TRADEMARK OFFICE

CERTIFICATE OF CORRECTION

PATENT NO. : 6,447,200 B1
DATED : September 10, 2002
INVENTOR(S) : C. Stuart Hungerford, III It is certified that error appears in the above-identified patent and that said Letters Patent is hereby corrected as shown below:

Column 3,
Line 4, replace "Aligned" with -- aligned --.
Line 43, replace "male" with -- made --.

Column 5,
Line 4, replace "told" with -- mold --.

Signed and Sealed this

Fourteenth Day of January, 2003

JAMES E. ROGAN
*Director of the United States Patent and Trademark Office*